(No Model.)
B. ST. BERNARD.
BOAT DETACHING DEVICE.
No. 565,701. Patented Aug. 11, 1896.
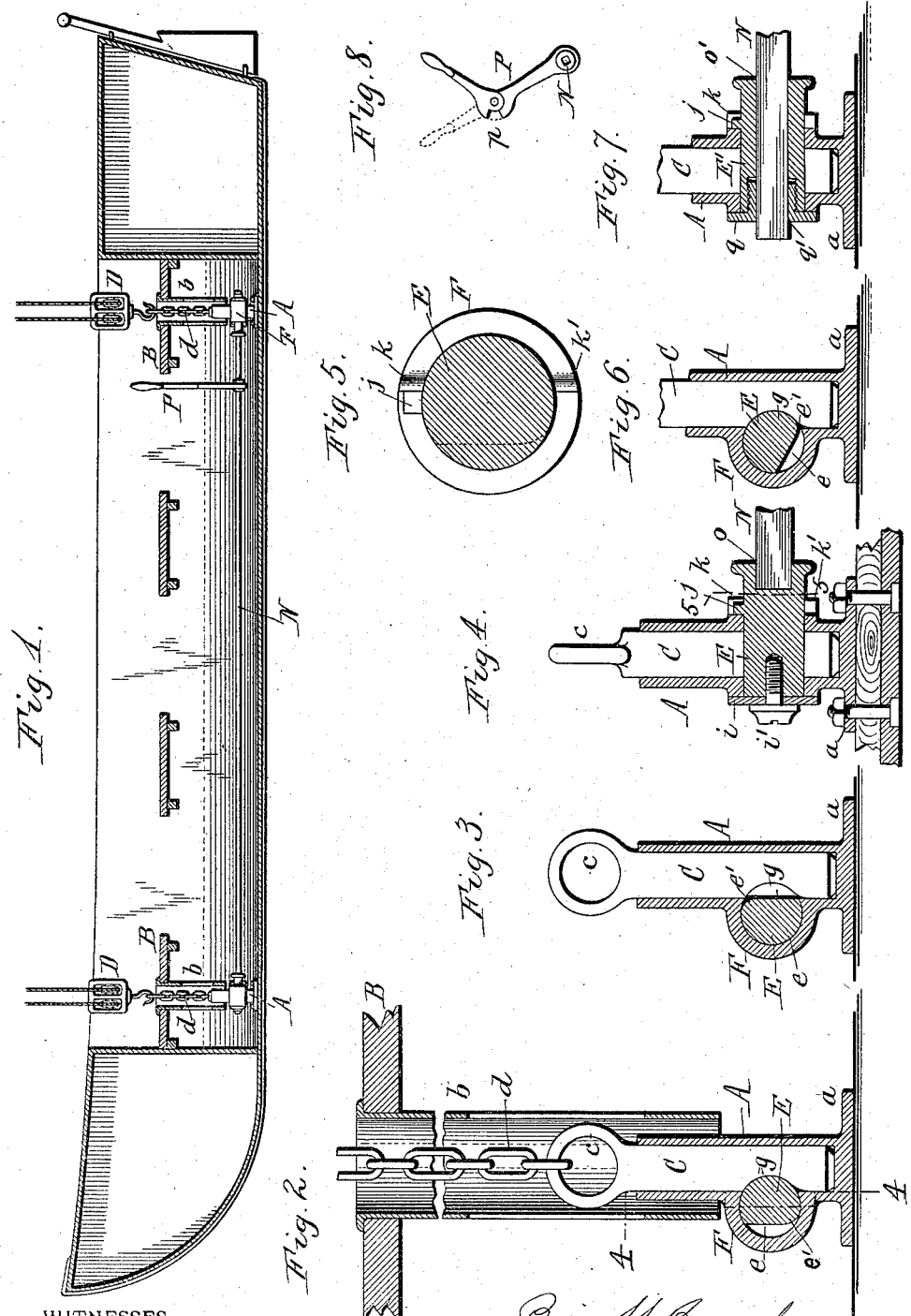
WITNESSES.
INVENTOR.
ATTORNEYS.

UNITED STATES PATENT OFFICE.

BION ST. BERNARD, OF ST. CLAIR, MICHIGAN.

BOAT-DETACHING DEVICE.

SPECIFICATION forming part of Letters Patent No. 565,701, dated August 11, 1896.

Application filed December 26, 1895. Serial No. 573,265. (No model.)

*To all whom it may concern:*

Be it known that I, BION ST. BERNARD, a citizen of the United States, residing at St. Clair, in the county of St. Clair and State of Michigan, have invented a new and useful Improvement in Boat-Detaching Devices, of which the following is a specification.

This invention relates to the coupling and detaching devices which are employed for detachably connecting life-boats with the suspension-tackle carried by the davits.

My invention has for its objects to produce a device of this kind which shall be simple in construction and reliable in action, and to provide a simple connection whereby the two devices at opposite ends of the boat are operated simultaneously, so that both ends of the boat are cast off at the same time.

In the accompanying drawings, Figure 1 is a longitudinal section of a boat provided with my improvement. Fig. 2 is an enlarged sectional elevation of one of the coupling and detaching devices, showing the parts interlocked. Fig. 3 is a similar view showing the coupling-bolt unlocked. Fig. 4 is a longitudinal section in line 4 4, Fig. 2. Fig. 5 is a cross-section in line 5 5, Fig. 4, on an enlarged scale. Fig. 6 is a fragmentary longitudinal section of the device, showing the locking-pin partly turned out of its locking position. Fig. 7 is a section similar to Fig. 4, showing a modification. Fig. 8 is a side elevation of the jointed hand-lever of the connecting-rod.

Like letters of reference refer to like parts in the several figures.

In practice one of my improved coupling and detaching devices is arranged at or near each end of the boat, and as they are identical in construction a description of one will suffice for both.

A is an upright socket, which is preferably secured to the bottom or keel of the boat underneath one of the end seats B by means of a projecting horizontal flange $a$, formed at the lower end of the socket and having openings for the passage of fastening screws or bolts, as shown in the drawings. The seat B is provided in line with the socket with an opening in which is arranged a tube or pipe $b$, which extends downwardly from its seat and incloses the upper portion of the socket A.

C is a connecting or coupling bolt, attached at its upper end to the lower block D of the suspension-tackle and adapted to enter the socket A. This bolt is preferably connected with the suspension-tackle by a chain $d$, and is provided at its upper end with an eye $c$, to which the lower end of the chain is fastened.

E is a rotary cylindrical locking-pin, journaled in a cylindrical bearing or enlargement F, arranged horizontally on one side of the socket A and adapted to interlock with a concave recess or depression $g$, formed in the adjacent side of the coupling-bolt C, as shown in Fig. 2, so as to confine the bolt in the socket. The bearing F is formed partly in the enlargement of the socket and partly in the adjacent side of the socket and opens into the latter, so that the cylindrical locking-pin intersects or projects into the cavity of the socket, as shown. The portion of the locking-pin arranged within the bearing F is provided on one side with a transverse releasing-recess $e$, which is adapted to face the recess $g$ of the coupling-bolt, as shown in Fig. 3, so as to release the bolt and allow it to slide out of the socket. The releasing-recess $e$ corresponds in depth and width with the recess $g$ of the coupling-bolt, so that when the locking-pin is turned in the proper position to bring the releasing-recess opposite the recess of the bolt the solid portion of the pin clears the bolt, and thus unlocks it. The locking-pin is provided at one end with a shoulder, which bears against the adjacent end of its bearing, and is confined in said bearing by a washer $i$, secured to the opposite end of the pin by a screw or bolt $i'$ and overlapping the end of the bearing, as shown in Fig. 4.

$j$ is a radial stop lug or projection arranged on the locking-pin, and $k\ k'$ are stops or shoulders arranged on the adjacent end of the bearing F, against one or the other of which the stop-lug of the locking-pin strikes when turned to either extreme of its movement. The stop-shoulders $k\ k'$ are arranged on diametrically opposite sides of the bearing F, and the lug of the locking-pin is so arranged relatively to the releasing-recess $e$ of the pin that when the same bears against the upper shoulder $k$, as shown in Figs. 4 and 5, the pin locks the bolt in the socket, while when the lug bears against the lower shoulder $k'$ the pin releases the bolt. By this arrangement of the stops the locking-pin is moved from one position to the other by a half-turn of the pin.

The front or leading edge $e'$ of the releasing-recess $e$ is blunt or rounded, as shown in Figs. 2 and 6, to prevent said edge from binding against the coupling-bolt under the weight of the suspended boat and facilitate the turning of the locking-pin in unlocking the bolt.

The attaching devices at opposite ends of the boat are arranged reversely, or rights and lefts, with the locking-pins E extending lengthwise of the boat. The two locking-pins are connected by an actuating-rod N, whereby the same are operated simultaneously. This actuating-rod extends lengthwise of the boat near the bottom thereof, and its ends are square or flat-sided and fit in correspondingly-shaped sockets $o$, formed in the outer or facing ends of the locking-pins. The rod is provided with a hand-lever P for turning it. This lever preferably consists of two members or sections connected by a rule-joint, and the shoulders $p$ of the two sections are arranged on the front side of the lever, so as to allow the outer or handle section of the lever to fold backward, while preventing the same from swinging forward beyond the dotted position shown in Fig. 8. In turning the hand-lever forwardly to release the boat from the suspension-tackle the weight of the boat tends to swing the actuating-rod and the handle-lever rapidly in the same direction when the locking-pin approaches or reaches the position shown in Fig. 6, and by jointing the hand-lever, its outer section, which is grasped by the operator, will fold backward and thereby prevent injury to the operator, which would be liable to occur if a rigid lever were employed.

In attaching the life-boat to the davit-tackle the locking-pins are turned into the position shown in Fig. 3, in which position they clear the cavities of the sockets A, and the coupling-bolts are then inserted in the sockets and locked therein by giving the pins a half-turn by means of the hand-lever, bringing the same into the position shown in Fig. 2. When it is desired to detach the boat from the tackle, the hand-lever is turned in the opposite direction until its movement is arrested by the stop-lugs $j$ of the locking-pins striking the lower stop-shoulders $k'$ of the sockets, whereby both coupling-bolts are released simultaneously and the boat is lowered into the water in a horizontal position, thus avoiding all danger of swamping or capsizing the same.

In the construction shown in Fig. 7 the locking-pin E' is provided with an opening or socket $o'$, extending through the pin E', and the actuating-rod N extends through the opening $o'$. The locking-pin is confined in the bearing F by a flanged screw-nut $q$, engaging in a threaded socket formed in the locking-pin and provided with an opening $q'$ in line with the opening $o'$, through which the end of the actuating-rod N passes.

My improved coupling and detaching device comprises but few parts, and can therefore be manufactured at comparatively small cost.

I claim as my invention—

1. A boat coupling and detaching device consisting of a socket adapted to be secured to the boat, a coupling-bolt carried by the suspension-tackle, adapted to enter said socket and having a locking-recess, and a rotary locking-pin journaled transversely on one side of said socket and intersecting the same and provided in one side with a releasing-recess whereby the locking-pin clears the coupling-bolt, substantially as set forth.

2. A boat coupling and detaching device consisting of a socket adapted to be secured to the boat and provided on one side with a transverse bearing intersecting said socket and having stop shoulders, a coupling-bolt carried by the suspension-tackle adapted to enter said socket and having a locking-recess, and a rotary locking-pin journaled in said bearing and having a releasing-recess whereby it clears said coupling-bolt, and a stop adapted to engage against the stops of said bearing, substantially as set forth.

3. A boat coupling and detaching device consisting of a socket adapted to be secured to the boat, a coupling-bolt carried by the suspension-tackle, adapted to enter said socket and having a locking-recess, and a rotary locking-pin journaled transversely on one side of said socket and intersecting the same and provided in one side with a releasing-recess, having a rounded front or advancing edge, substantially as set forth.

4. In a boat coupling and detaching device, the combination with a socket provided at its lower end with an attaching-flange for securing the same to the boat and having on one side a transverse bearing intersecting the cavity of the socket, of a coupling-bolt carried by the suspension-tackle and having a locking-recess and a cylindrical locking-pin journaled in said bearing and having a releasing-recess whereby the locking-pin clears the coupling-bolt, substantially as set forth.

5. The combination with a pair of coupling and detaching devices arranged at or near opposite ends of a boat and each consisting of a socket secured to the boat, a coupling-bolt carried by the suspension-tackle and provided with a locking-recess, a locking-pin journaled transversely on one side of said socket, intersecting the cavity thereof and provided with a releasing-recess, the locking-pins of the two devices being arranged lengthwise of the boat and facing each other, of a longitudinal actuating-rod connecting said locking-pins, whereby the same are operated simultaneously and a hand-lever secured to said actuating-rod, substantially as set forth.

Witness my hand this 21st day of December, 1895.

BION ST. BERNARD.

Witnesses:
  JNO. J. BONNER,
  ELLA R. DEAN.